(12) United States Patent
Brunnig et al.

(10) Patent No.: US 11,420,667 B1
(45) Date of Patent: Aug. 23, 2022

(54) CART POCKET TO PREVENT LONG ITEMS FROM PASSING THROUGH SHOPPING CART

(71) Applicants: Samuel Brunnig, Pinellas Park, FL (US); Matthew Brunnig, Pinellas Park (UA)

(72) Inventors: Samuel Brunnig, Pinellas Park, FL (US); Matthew Brunnig, Pinellas Park (UA)

(*) Notice: Subject to any disclaimer, the term of this patent is extended or adjusted under 35 U.S.C. 154(b) by 0 days.

(21) Appl. No.: 17/455,227

(22) Filed: Nov. 17, 2021

(51) Int. Cl.
  *B62B 3/04* (2006.01)
  *B62B 3/14* (2006.01)
  *B62B 3/10* (2006.01)

(52) U.S. Cl.
  CPC ............ *B62B 3/1472* (2013.01); *B62B 3/102* (2013.01); *B62B 2203/60* (2013.01)

(58) Field of Classification Search
  CPC ..... B62B 3/102; B62B 3/1468; B62B 3/1472; B62B 2203/60; A47K 5/02
  See application file for complete search history.

(56) References Cited

U.S. PATENT DOCUMENTS

| | | | | |
|---|---|---|---|---|
| 2,456,817 A | * | 12/1948 | Davenport | B62B 3/14 220/8 |
| 2,590,154 A | * | 3/1952 | Burns | B62B 1/262 280/DIG. 6 |
| 3,004,815 A | * | 10/1961 | O'Kain | A47B 67/005 52/211 |
| 3,157,871 A | * | 11/1964 | Umanoff | H04B 1/24 340/673 |
| 3,706,460 A | * | 12/1972 | Thomas | B62B 3/18 186/62 |
| 5,002,292 A | * | 3/1991 | Myers | B62B 3/146 D34/27 |
| 5,494,308 A | * | 2/1996 | Southerland | B62B 3/1468 280/288.4 |
| 5,542,687 A | * | 8/1996 | Harris | B62B 3/146 280/33.993 |
| 5,553,876 A | * | 9/1996 | Trubiano | B62B 3/1468 280/DIG. 4 |
| 5,836,596 A | * | 11/1998 | Wanzl | B62B 3/18 280/33.991 |
| 5,901,482 A | * | 5/1999 | Sawyer | B62B 3/1408 40/611.05 |
| 5,961,133 A | * | 10/1999 | Perry | B62B 3/144 280/33.993 |

(Continued)

*Primary Examiner* — Emma K Frick
(74) *Attorney, Agent, or Firm* — Larson & Larson, P.A.; Justin P. Miller; Frank Liebenow

(57) ABSTRACT

The cart pocket is a recess or pocket for installation at the front of a shopping cart or trolley. The cart pocket retains the end of one or more long objects, preventing the long objects from sliding through the wire frame of the shopping cart. The cart pocket is preferably built into the cart during initial construction but can be installed by removing a section of the wire or plastic frame of the cart, this section replaced with the cart pocket. This installation is ideal because the wire mesh is removed, simplifying access to the recess. Placing the recess outside the basket avoids interference with the contents of the basket. Alternatively, the cart pocket may be installed without removing a section of wire frame, the pocket placed either inside or outside of the basket of the cart.

14 Claims, 7 Drawing Sheets

(56) References Cited

U.S. PATENT DOCUMENTS

| | | | |
|---|---|---|---|
| 6,126,181 A * | 10/2000 | Ondrasik | B62B 3/1468 280/47.35 |
| D451,589 S * | 12/2001 | Axelsson | D23/387 |
| 6,406,041 B1 * | 6/2002 | Rea | B62B 3/1468 280/DIG. 4 |
| 6,450,513 B1 * | 9/2002 | Bernstein | B62B 3/1472 40/308 |
| 6,641,147 B2 * | 11/2003 | Werner | B62B 3/1472 280/47.35 |
| D484,666 S * | 12/2003 | Caya | D34/27 |
| 6,761,365 B2 * | 7/2004 | Teeten | B62B 3/18 280/DIG. 4 |
| 6,766,931 B2 * | 7/2004 | Wolf | B62B 3/1464 280/33.993 |
| 7,073,800 B2 * | 7/2006 | Shaw | B62B 3/144 280/47.38 |
| 7,134,674 B2 * | 11/2006 | Frommherz | B62B 3/1468 280/33.992 |
| 7,185,898 B2 * | 3/2007 | Cote | B62B 3/1472 280/47.35 |
| 7,192,035 B1 * | 3/2007 | Lioce | B62B 3/1472 280/33.991 |
| 7,270,338 B1 * | 9/2007 | Edgar | B62B 3/1464 280/33.992 |
| 7,475,885 B2 * | 1/2009 | Kovath | B62B 3/1468 280/33.993 |
| 7,681,891 B2 * | 3/2010 | Deal | B62B 3/1472 280/33.997 |
| 7,849,615 B2 * | 12/2010 | Giampavolo | G09F 23/06 297/256.17 |
| 8,052,158 B2 * | 11/2011 | Tyrrell | B62B 3/1472 280/47.35 |
| D653,316 S * | 1/2012 | Beswick | D23/305 |
| 8,162,331 B2 * | 4/2012 | Simonson | B62B 3/1464 280/47.35 |
| D689,282 S * | 9/2013 | Lindeman | D3/231 |
| 8,783,697 B1 * | 7/2014 | Wilhite | B62B 3/1464 280/DIG. 4 |
| 9,027,941 B2 * | 5/2015 | Cimino | B62B 3/10 280/47.38 |
| 9,174,659 B2 * | 11/2015 | Stauff | B62B 3/1476 |
| 9,199,656 B1 * | 12/2015 | Tong | B62B 3/18 |
| 9,227,646 B2 * | 1/2016 | Stauff | B62B 3/1476 |
| 10,414,421 B1 * | 9/2019 | Westmoreland | B62B 3/10 |
| 10,513,282 B2 * | 12/2019 | Bacallao | B62B 3/14 |
| 10,762,309 B2 * | 9/2020 | Roth | B62B 3/00 |
| 10,988,156 B1 * | 4/2021 | Reiersen | B62B 3/102 |
| 11,110,947 B2 * | 9/2021 | Finstad | B62B 5/0009 |
| 11,185,180 B2 * | 11/2021 | Albrecht | B62B 9/26 |
| 11,325,626 B2 * | 5/2022 | Sannes | B62B 3/004 |
| 2003/0052464 A1 * | 3/2003 | McGuire | B62B 3/102 280/33.992 |
| 2005/0212234 A1 * | 9/2005 | McFarland | B62B 3/1472 280/33.992 |
| 2005/0275177 A1 * | 12/2005 | Buckley, III | B62B 3/1468 280/47.34 |
| 2007/0029745 A1 * | 2/2007 | Ursettie | B62B 3/1472 280/33.992 |
| 2012/0145758 A1 * | 6/2012 | Taylor | B62B 3/1472 224/411 |
| 2014/0084036 A1 * | 3/2014 | Hemann | B62B 3/1468 224/411 |

* cited by examiner

CART POCKET TO PREVENT LONG ITEMS FROM PASSING THROUGH SHOPPING CART

FIELD

This invention relates to the field of shopping carts and more particularly to a device for containing objects within a shopping cart.

BACKGROUND

The shopping cart revolutionized shopping. Rather than customers having to carry their items in baskets or bags, they could use a large wheeled bin to carry substantial and heavy purchases. The result was an increase in purchasing, and the birth of larger stores.

Shopping carts were created with supermarkets in mind. Thus, their wire mesh construction is ideal for the boxes and bags that dominate a grocery store. But long slender objects, such as dowels, tubes, curtain rods, broom handles, quarter-round molding, and conduit, tend to pass through the gaps in the wire mesh.

What is needed is a device to prevent long slender objects from sliding through the end of a wire mesh shopping cart, instead containing the long slender objects.

SUMMARY

The cart pocket is a recess or pocket for installation at the front of a shopping cart or trolley. The cart pocket retains the end or tip of one or more long objects, preventing the long objects from sliding through the wire frame of the shopping cart.

The cart pocket is preferably installed during cart manufacture as part of the cart, but can be installed by removing a section of the wire or plastic shell or frame of the cart, this section replaced with the cart pocket. Placing the recess outside the basket avoids interference with the contents of the basket.

Alternatively, the cart pocket may be installed without removing a section of wire frame, the pocket placed either inside or outside of the basket of the cart.

If the pocket is placed on the inside of the basket, the long objects can be placed into the recess without passing through the wire frame.

If the pocket is placed on the outside of the basket, the long objects can be placed into the recess after passing through the wire frame.

The pocket is preferably affixed to the front side of the cart using fasteners. Alternatively, the pocket snaps into position, or is affixed using an adhesive.

The cart pocket is preferably located such that it does not impede the nesting, or accordion stacking, of multiple carts together.

In a first alternative embodiment, the pocket is not static, but instead folds out for use. A spring-loaded hinge supports a plate with a lip. When a long slender object needs to be retained, the plate rotates outward, the lip catching the tip of the long item.

In a second alternative embodiment the pocket includes a rail system. The rail is affixed to the bottom of the cart, where it supports a sliding L-shaped section. As slender objects are passed through the wire mesh, the tip is captured by the upward-facing leg of the L-shaped section, preventing the object from sliding fully out of the cart.

In a third alternative embodiment, the pocket is formed from a flexible material, such as a cloth pouch. The pouch can expand to prevent the passage of a long object, with sufficient expansion to keep the end of the long object within the pouch and avoid it falling back into the basket.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
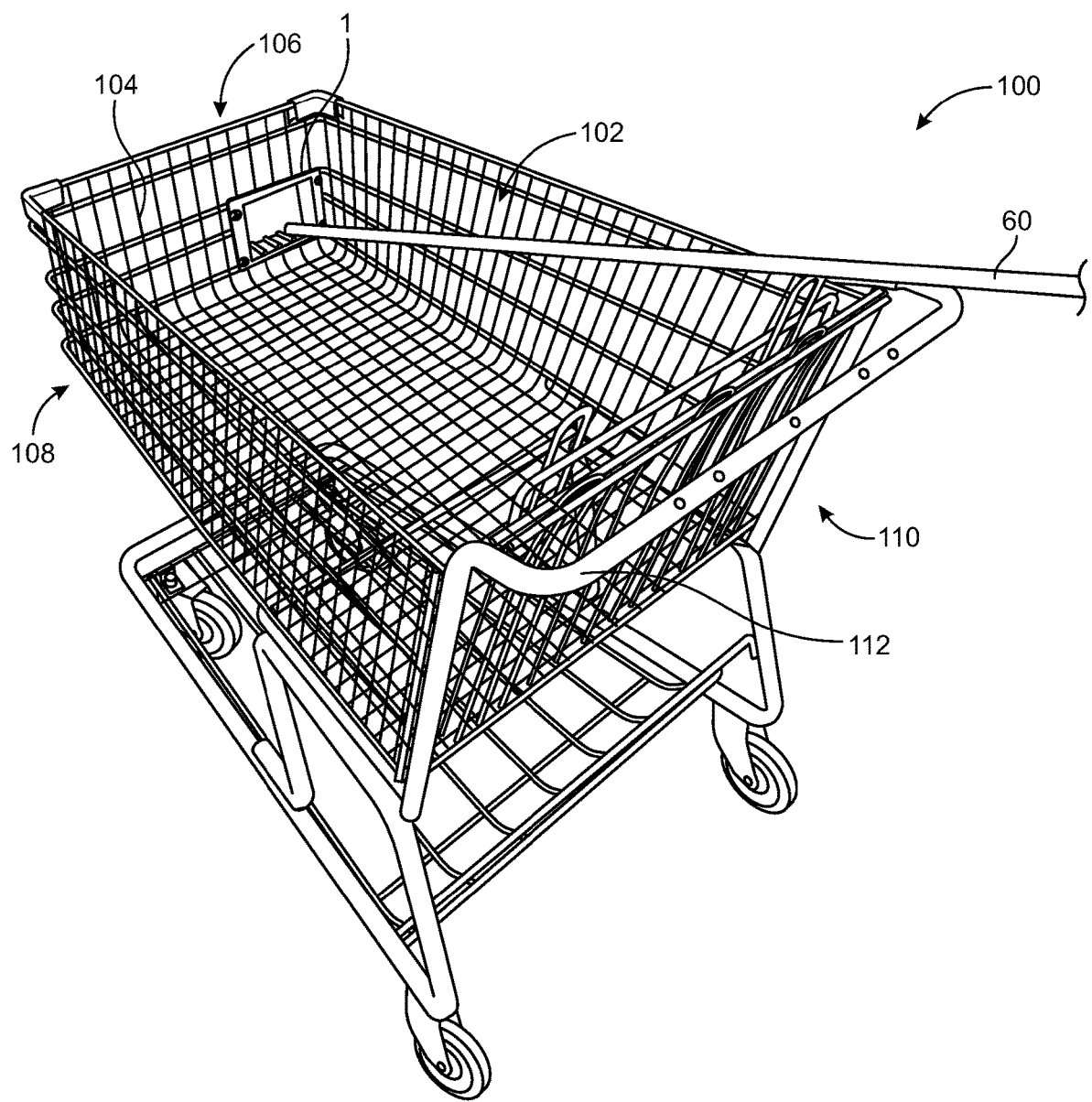
FIG. 1 illustrates a first isometric view of the cart pocket.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a first isometric view of the cart pocket is shown.

The cart pocket 1 is installed in the front 106 of the basket 102 of the shopping cart 100.

The shopping cart 100 includes a wire or plastic frame 104 that defines the basket 102, the basket including a front 106, two sides 108, and a back 110.

A slender object 60 rests against the handle 112, its tip retained in the cart pocket 1.

Figure 2:
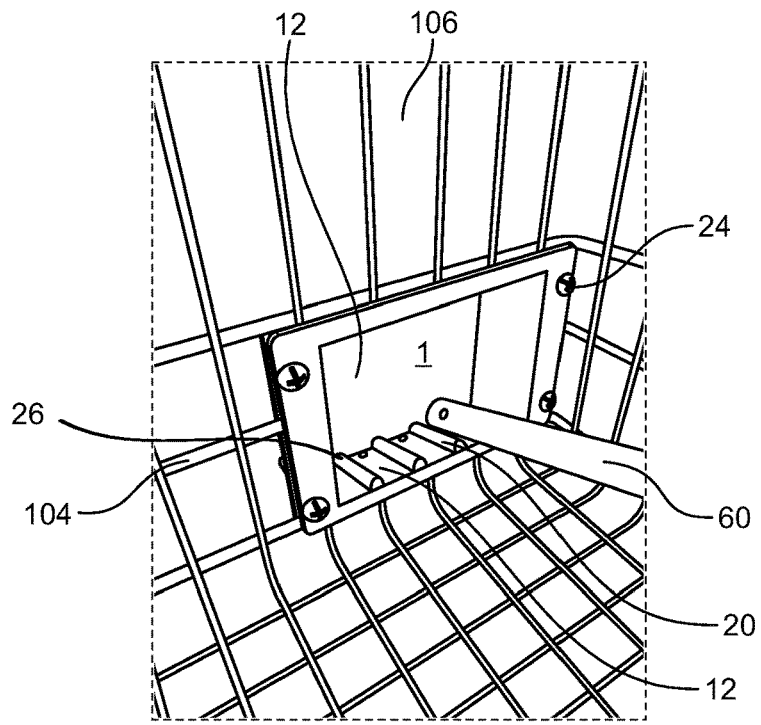
FIG. 2 illustrates a first detail view, after installation, of the cart pocket.

Referring to FIG. 2, a first detail view, after installation, of the cart pocket is shown.

The cart pocket 1 includes a rear wall 12 to prevent the slender object 60 from sliding through the front 106 of the basket 102 (see FIG. 1).

The fasteners 24 hold the cart pocket 1 to the wire frame 104. One or more retaining ridges 26 prevent the slender object 60 from sliding left-to-right as the cart 100 (see FIG. 1) moves.

Figure 3:
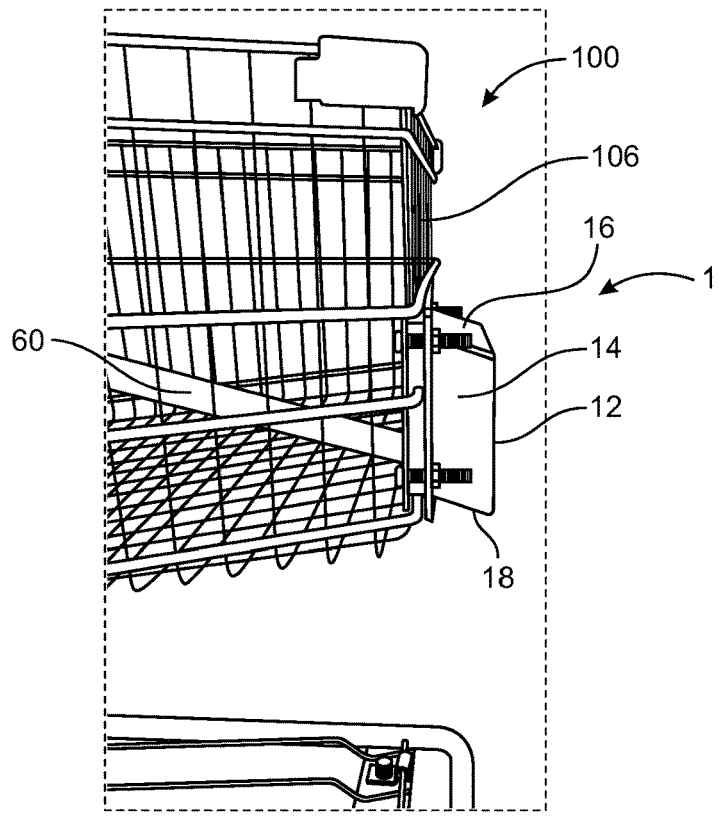
FIG. 3 illustrates a second detail view, after installation, of the cart pocket.

Referring to FIG. 3, a second detail view, after installation, of the cart pocket is shown. The slender object 60 is resting within the cart pocket 1.

The side wall 14, top wall 16, and bottom wall 18 or the cart pocket 1 are visible.

The rear wall 12 is shown as parallel to the front 106 of the shopping cart 100. While this is preferred, the rear wall 12 may also be set at an angle.

The top wall 16 and bottom wall 18 are shown with an optional downward angle, helping to catch the tip of the slender object 60. The downward angle helps to prevent the slender object 60 from moving backward into the shopping cart 100.

Figure 4:
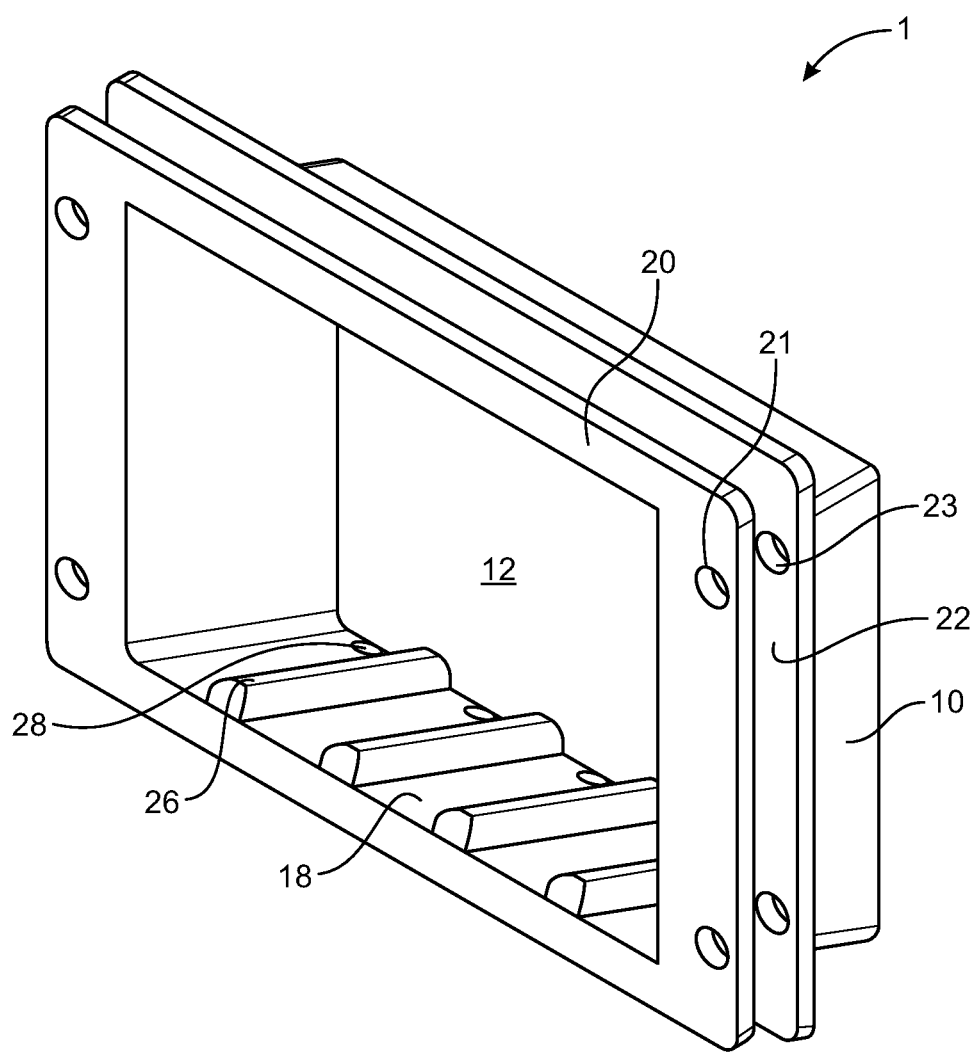
FIG. 4 illustrates an isometric view of the cart pocket.

Referring to FIG. 4, an isometric view of the cart pocket is shown.

For embodiments of the cart pocket 1 that are installed into existing carts, a means of attaching the cart pocket 1 is required. One such means of attachment is shown in FIG. 4.

The perimeter wall or flange 20 includes one or more perimeter wall holes 21, and the collar 22 includes one or more collar holes 23. A fastener 24 (see FIG. 2) passes from a perimeter wall hole 21 to a collar hole 23, pulling the movable collar 22 up against the perimeter wall 20, and stabilizing the cart pocket 1.

The retaining ridges 26 are placed along the bottom wall 18 of body 10, with optional drain holes 28 where the bottom wall 18 meets the rear wall 12.

Figure 5:
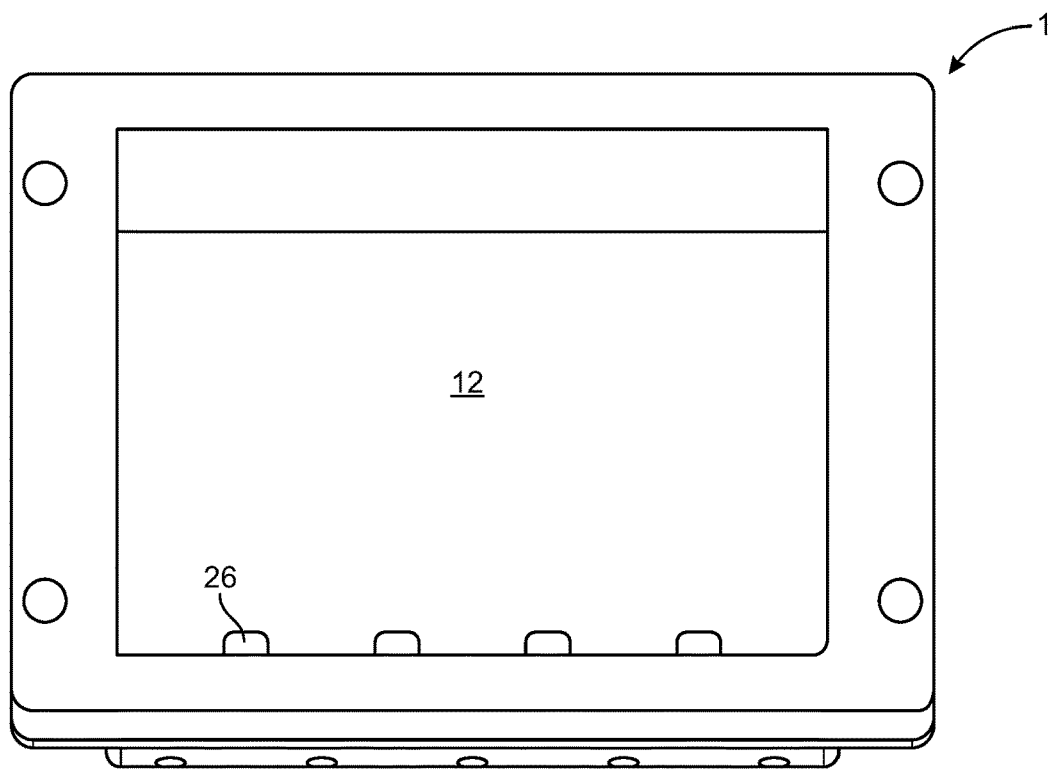
FIG. 5 illustrates a front view of the cart pocket.
Figure 6:
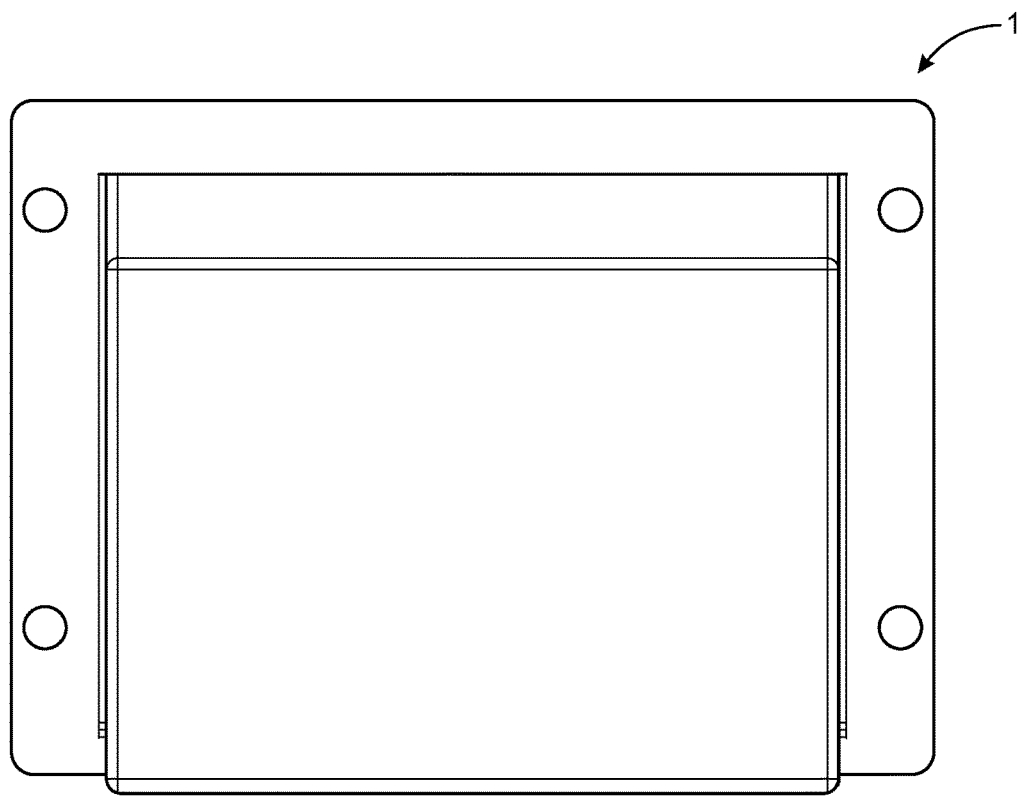
FIG. 6 illustrates a back view of the cart pocket.

Referring to FIGS. 5 and 6, a front view and a back view of the cart pocket are shown.

The cart pocket 1 is shown with rear wall 12 and retaining ridges 26.

Figure 7:
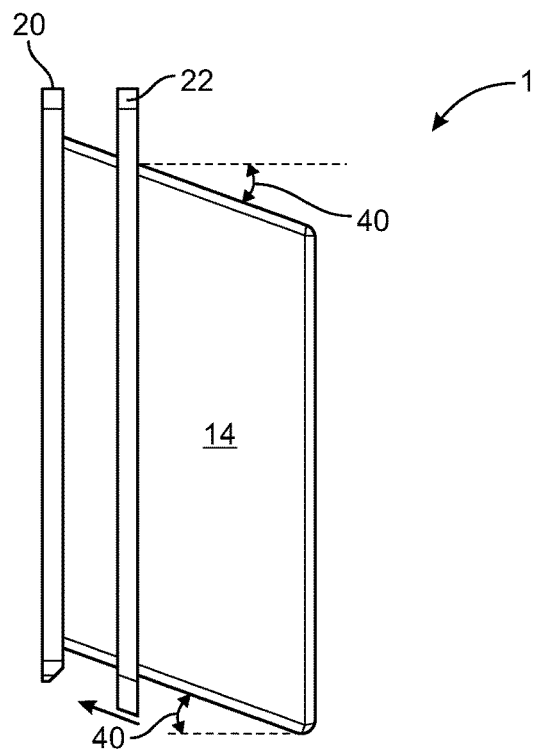
FIG. 7 illustrates a left-side view of the cart pocket.
Figure 8:
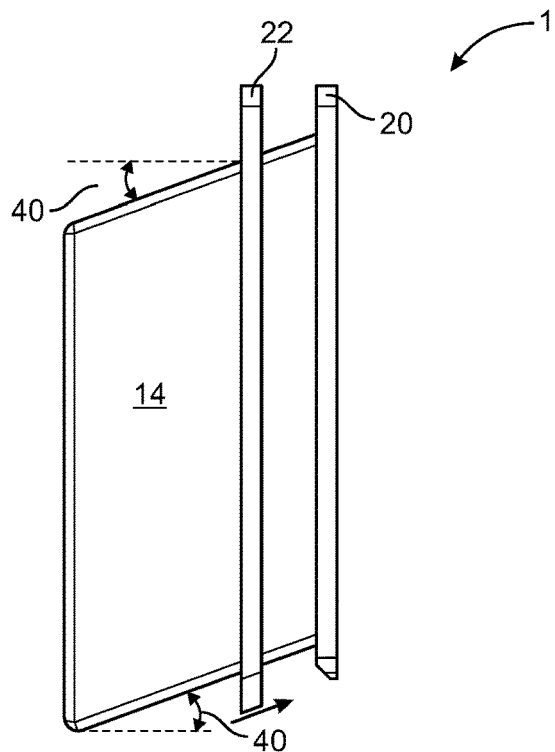
FIG. 8 illustrates a right-side view of the cart pocket.

Referring to FIGS. 7 and 8, a left-side and right-side view of the cart pocket are shown.

The cart pocket 1 is preferably angled downward because it will be placed at a position lower than the handle 112 of the cart 100 (see FIG. 1). Stated differently, the cart pocket 1 is set at an angle greater than 90-degrees with respect to the vertical perimeter wall 20.

Thus, the bottom wall 18 is set at a declination angle 40 with respect to horizontal.

The collar 22 is shown placed around the cart pocket 1, able to be compressed against the perimeter wall 18.

Figure 9:
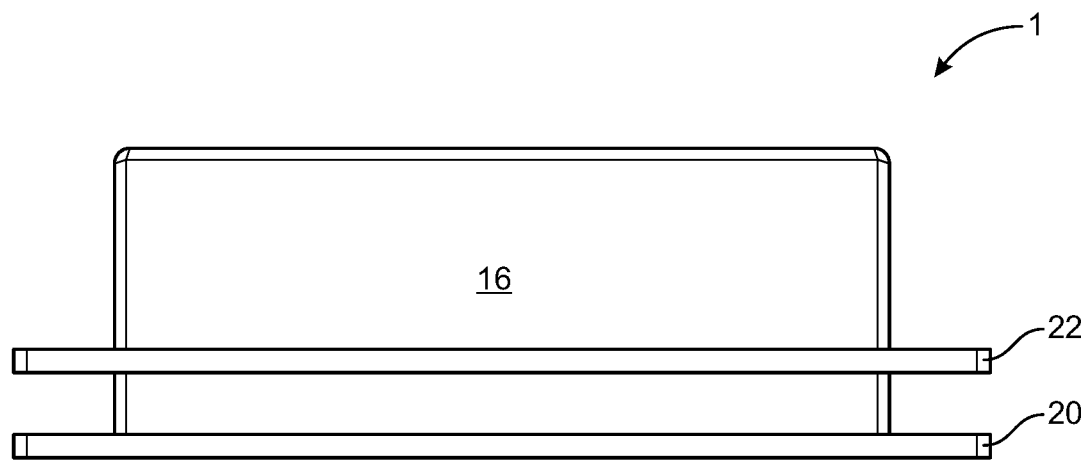
FIG. 9 illustrates a top view of the cart pocket.
Figure 10:
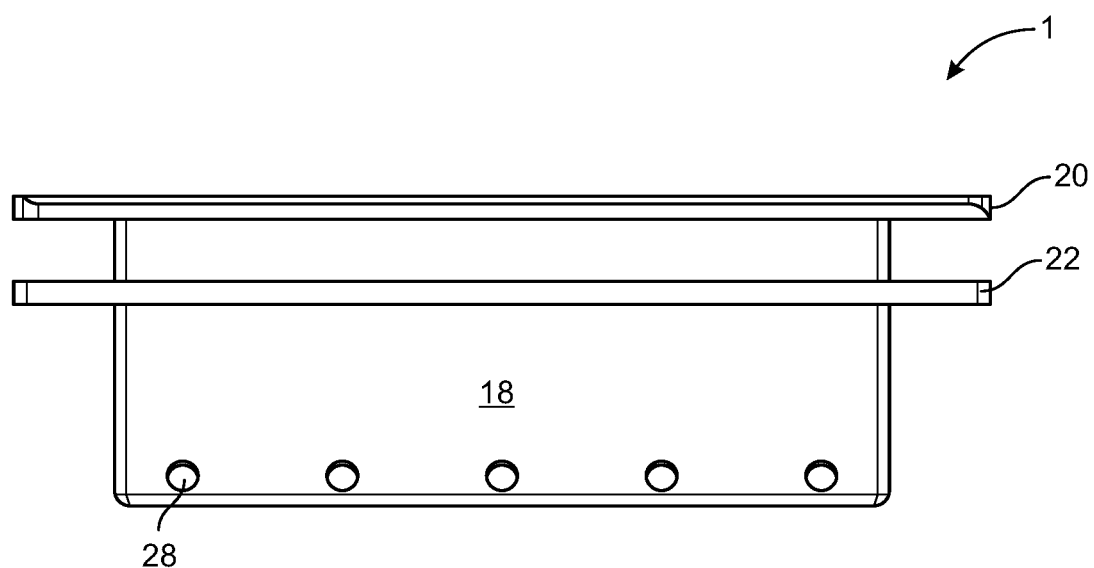
FIG. 10 illustrates a bottom view of the cart pocket.

Referring to FIGS. 9 and 10, a top view and a bottom view of the cart pocket are shown.

The cart pocket 1 is shown with top wall 16 and bottom wall 18, joined by a perimeter wall 20, against which the collar 22 is compressed for installation.

Figure 11:
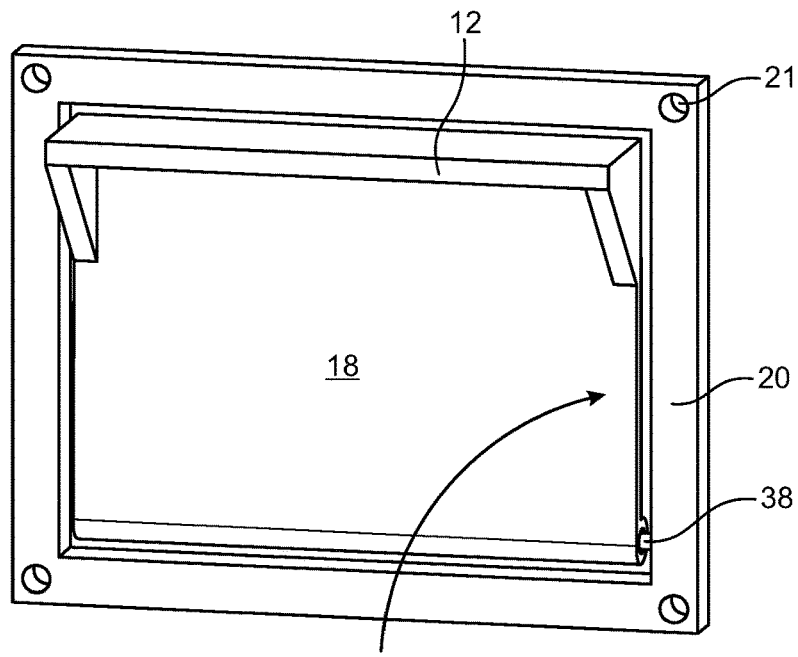
FIG. 11 illustrates an isometric view of a folding embodiment of the cart pocket.

Referring to FIG. 11, an isometric view of a folding embodiment of the cart pocket is shown.

The perimeter wall 20 and perimeter wall holes 21 remain, with the bottom wall 18 able to rotate about a hinge 38, the rear wall 12 rotating downward to catch slender objects 60 (see FIG. 1).

Figure 12:
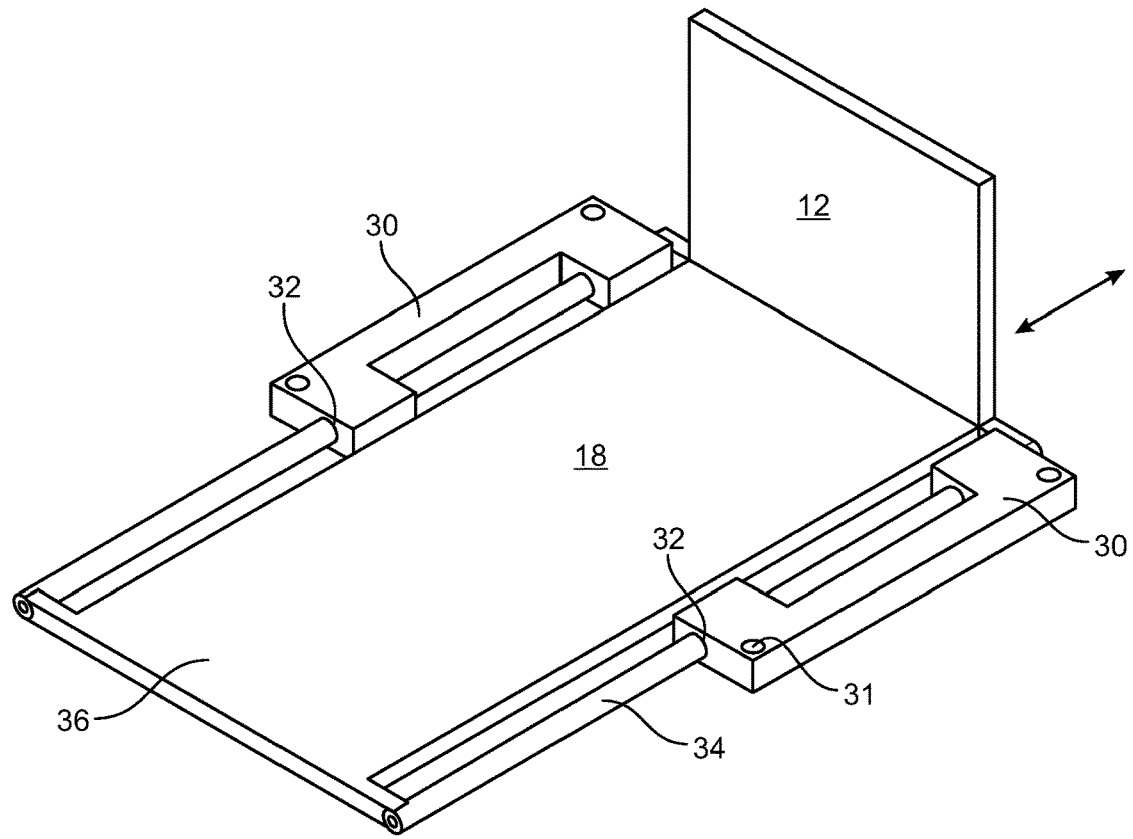
FIG. 12 illustrates an isometric view of a sliding embodiment of the cart pocket.

Referring to FIG. 12, an isometric view of a sliding embodiment of the cart pocket is shown.

The bottom wall 18 and rear wall 12 are fixed in position with respect to each other. The walls 12/18 together form the sliding member 36, which uses rods 34 to slide inside of through-holes 32, which are part of fixed plates 30. The fixed plates 30 are affixed to the cart 100 (see FIG. 1) using plate holes 31.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A cart pocket that affixes to a front of a shopping cart with a wire mesh basket, the wire mesh basket having a front wall, the cart pocket comprising:
   a rear wall;
   the rear wall substantially parallel to the front of the shopping cart, thus obstructing objects from sliding out through the front wall;
   a perimeter wall;
   the perimeter wall adjoining the rear wall;
   the perimeter wall to rest against the front of the shopping cart to stabilize the cart pocket and hold the cart pocket in place;
   a bottom wall;
   the bottom wall connecting the rear wall and the perimeter wall;
   the bottom wall set at a downward angle of greater than 90-degrees with respect to the perimeter wall;
   the rear wall, the perimeter wall, and the bottom wall together forming a recess;
   the recess accessible from an inside of the shopping cart;
   one or more retaining ridges;
   the one or more retaining ridges integrated into a bottom wall of the cart pocket;
   a collar;
   the collar surrounding the rear wall, the perimeter wall, and the bottom wall;
   the collar removably fastened to the perimeter wall;
   the collar and the perimeter wall on opposite faces of the wire mesh basket, thus stabilizing the cart pocket with respect to the wire mesh basket;
   whereby the downward angle of the bottom wall prevents objects from moving backward into the wire mesh basket of the shopping cart.

2. A cart pocket placed at a front of a shopping cart the cart pocket comprising:
   a rear wall;
   the rear wall substantially parallel to the front of the shopping cart, thus obstructing objects from sliding out through a front wall of the shopping cart;
   a perimeter wall;
   the perimeter wall adjoining the rear wall;
   the perimeter wall to rest against the front of the shopping cart to stabilize the cart pocket and hold the cart pocket in place;
   a bottom wall;
   the bottom wall connecting the rear wall and the perimeter wall;
   the rear wall, the perimeter wall, and the bottom wall together forming a recess;
   the recess accessible from an inside of the shopping cart;
   wherein the cart pocket is located such that multiple shopping carts can nest within each other;
   whereby the cart pocket is integrated into the shopping cart, or the shopping cart is modified to accept the cart pocket.

3. The cart pocket placed at a front of a shopping cart of claim 2, further comprising:
   a collar;
   the collar surrounding the rear wall, the perimeter wall, and the bottom wall;
   the collar removably fastened to the perimeter wall;
   the collar and the perimeter wall on opposite faces of a basket of the shopping cart, thus stabilizing the cart pocket with respect to the shopping cart.

4. The cart pocket placed at a front of a shopping cart of claim 2, wherein:
   the cart pocket is formed from the rear wall, more side walls, the perimeter wall, and the bottom wall.

5. The cart pocket placed at a front of a shopping cart of claim 2, wherein the cart pocket is sloped downward with respect to a front wall of the shopping cart.

6. The cart pocket placed at a front of a shopping cart of claim 2, wherein:
- the cart pocket includes a bottom wall;
  - the bottom wall has a downward angle of greater than 90-degrees with respect to the perimeter wall;
  - whereby the downward angle prevents slender objects from moving backward into a mesh basket of the shopping cart.

7. The cart pocket placed at a front of a shopping cart of claim 2, further comprising:
- one or more retaining ridges;
  - the one or more retaining ridges integrated into a bottom wall of the cart pocket;
  - the one or more retaining ridges reducing side-to-side sliding of a tip of slender objects within the cart pocket.

8. A device that affixes to a front face of a mesh basket of a shopping cart, the device comprising:
- a body that creates a recess;
  - the recess opening toward the front face of the mesh basket of the shopping cart;
  - the recess is accessible by passing through the front face of the mesh basket of the shopping cart;
- a perimeter wall;
  - the perimeter wall joined to the body;
  - the perimeter wall mounted parallel to the front face of the mesh basket;
  - the perimeter wall stabilizing the body with respect to the front face of the mesh basket.
- the body includes a bottom wall;
  - the bottom wall has a downward angle of greater than 90-degrees with respect to the perimeter wall;
  - whereby the downward angle prevents objects from moving backward into the mesh basket of the shopping cart; and
  - whereby the recess acts as an extension to an interior of the shopping cart.

9. The device that affixes to a front face of a mesh basket of a shopping cart of claim 8, wherein the body attaches to the front face of the mesh basket.

10. The device that affixes to a front face of a mesh basket of a shopping cart of claim 8, wherein the body is built into to the front face of the mesh basket.

11. The device that affixes to a front face of a mesh basket of a shopping cart of claim 8, further comprising:
- a collar;
  - the collar surrounding the body;
  - the collar removably fastened to the perimeter wall;
  - the collar and the perimeter wall on opposite faces of the mesh basket, thus stabilizing the body with respect to the mesh basket.

12. The device that affixes to a front face of a mesh basket of a shopping cart of claim 8, wherein:
- the body is formed from a rear wall, two side walls, a top wall, and the bottom wall;
- the body opening horizontally, toward the shopping cart.

13. The device that affixes a front face of a mesh basket of a shopping cart of claim 8, wherein the body is sloped downward with respect to the front face of the shopping cart.

14. The device that affixes to a front face of a mesh basket of a shopping cart of claim 8, further comprising:
- one or more retaining ridges;
  - the one or more retaining ridges integrated into the bottom wall of the body;
  - the one or more retaining ridges reducing side-to-side sliding of objects within the body.

* * * * *